(12) United States Patent
Choi et al.

(10) Patent No.: US 9,930,664 B2
(45) Date of Patent: Mar. 27, 2018

(54) METHOD AND DEVICE FOR CONTROLLING CARRIER AGGREGATION IN WIRELESS COMMUNICATION SYSTEM

(71) Applicant: Samsung Electronics Co., Ltd., Suwon-si, Gyeonggi-do (KR)

(72) Inventors: Donghwan Choi, Daegu (KR); Soonjin Kim, Seongnam-si (KR); Haedong Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 14/732,940

(22) Filed: Jun. 8, 2015

(65) Prior Publication Data

US 2015/0358969 A1 Dec. 10, 2015

(30) Foreign Application Priority Data

Jun. 10, 2014 (KR) .................. 10-2014-0070159

(51) Int. Cl.
*H04W 72/04* (2009.01)
*H04M 3/02* (2006.01)

(52) U.S. Cl.
CPC ......... *H04W 72/0453* (2013.01); *H04M 3/02* (2013.01); *H04W 72/0486* (2013.01)

(58) Field of Classification Search
None
See application file for complete search history.

(56) References Cited

U.S. PATENT DOCUMENTS

| | | |
|---|---|---|
| 2010/0113050 A1 | 5/2010 | Cheng et al. |
| 2011/0038280 A1 | 2/2011 | Jung et al. |
| 2011/0105141 A1 | 5/2011 | Jung et al. |
| 2012/0147772 A1* | 6/2012 | Kazmi ............... H04L 5/0078 370/252 |
| 2012/0218963 A1 | 8/2012 | Kim et al. |
| 2013/0039231 A1 | 2/2013 | Wang |
| 2013/0201834 A1* | 8/2013 | Klingenbrunn ....... H04W 28/12 370/236 |
| 2013/0244656 A1* | 9/2013 | Heo .................... H04W 52/243 455/436 |
| 2013/0246312 A1* | 9/2013 | Lee .................. G06F 17/30554 705/400 |
| 2015/0085792 A1* | 3/2015 | Reddy ................. H04W 16/14 370/329 |
| 2015/0156693 A1* | 6/2015 | Tabet ................... H04W 36/30 455/437 |

(Continued)

FOREIGN PATENT DOCUMENTS

KR 10-2015-0002333 A 1/2015

*Primary Examiner* — Charles C Jiang
*Assistant Examiner* — Rose Clark
(74) *Attorney, Agent, or Firm* — Jefferson IP Law, LLP

(57) ABSTRACT

A method of controlling carrier aggregation (CA) and an electronic device configured to perform the method are provided. The method of controlling CA of an electronic device includes connecting a call between the electronic device and a base station, monitoring an amount of data used for transmission/reception during the connected call, determining an estimated amount of time to use a function executed on the electronic device, and configuring CA based on the amount of data used and the estimated amount of time to use a function.

17 Claims, 12 Drawing Sheets

(56) References Cited

U.S. PATENT DOCUMENTS

| | | | |
|---|---|---|---|
| 2015/0208414 A1* | 7/2015 | Ji | H04W 36/0072 |
| | | | 455/436 |
| 2016/0029233 A1* | 1/2016 | Kollar | H04W 24/08 |
| | | | 370/252 |
| 2016/0119945 A1* | 4/2016 | Fang | H04W 72/1284 |
| | | | 455/450 |
| 2016/0301504 A1* | 10/2016 | Toskala | H04W 48/16 |

* cited by examiner

METHOD AND DEVICE FOR CONTROLLING CARRIER AGGREGATION IN WIRELESS COMMUNICATION SYSTEM

CROSS-REFERENCE TO RELATED APPLICATION(S)

This application claims the benefit under 35 U.S.C. § 119(a) of a Korean patent application filed on Jun. 10, 2014 in the Korean Intellectual Property Office and assigned Serial number 10-2014-0070159, the entire disclosure of which is hereby incorporated by reference.

TECHNICAL FIELD

The present disclosure relates to a method of controlling carrier aggregation (CA) in a wireless communication system and to an electronic device configured to perform the method.

BACKGROUND

In recent years, wireless communication technologies have been developed to provide various services according to users' demands. In Long Term Evolution (LTE) as the $4^{th}$ generation mobile communication system, carrier aggregation (CA) has been introduced to meet the rapid increase in the demand for traffic. Carrier aggregation refers to a technology that uses a plurality of carriers in communication between an electronic device and a base station to perform transmission/reception of data, instead of using only one carrier in conventional art, thereby enhancing the transmission rate (or extending the bandwidth). For example, in LTE systems employing CA, a cell where a primary carrier is served is called a Primary Cell (PCELL) and a cell where a secondary carrier is served is called a Secondary Cell (SCELL). In LTE systems using CA, call connection and signaling between user equipment (UE) and a base station are established through the PCELL and transmission/reception of data may simultaneously be performed by the PCELL and the SCELL. In order to provide CA services described above, a system for configuring the SCELL is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method that controls carrier aggregation in a wireless communication system to support the configuration of a secondary cell (SCELL), based on data that is being transmitted or functions that are being executed on the electronic device.

Conventional electronic devices configure an SCELL in a state where a call is established and maintain the configuration until the call is disconnected. Conventional electronic devices may also configure an SCELL when the wireless signal is greater than or equal to a preset level and release the configuration of the SCELL when the wireless signal is less than a preset level.

However, since conventional systems are designed to configure an SCELL without regard to data that is being transmitted or functions that are being executed on an electronic device, they cause the waste of wireless resources or the excessive consumption of battery.

In accordance with an aspect of the present disclosure, a method of controlling carrier aggregation (CA) of an electronic device is provided. The method includes connecting a call between the electronic device and a base station, monitoring an amount of data used for transmission/reception during the connected call, determining an estimated amount of time to use a function executed on the electronic device, and configuring CA based on the amount of data used and the estimated amount of time to use a function.

In accordance with another aspect of the present disclosure, an electronic device is provided. The electronic device includes a communication interface and a processor. The processor is configured to: control the communication interface to connect a call between the electronic device and a base station, monitor an amount of data used for transmission/reception through the connected call, determine an estimated amount of time to use a function executed on the electronic device, and configure CA based on the amount of data used and the estimated amount of time to use a function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
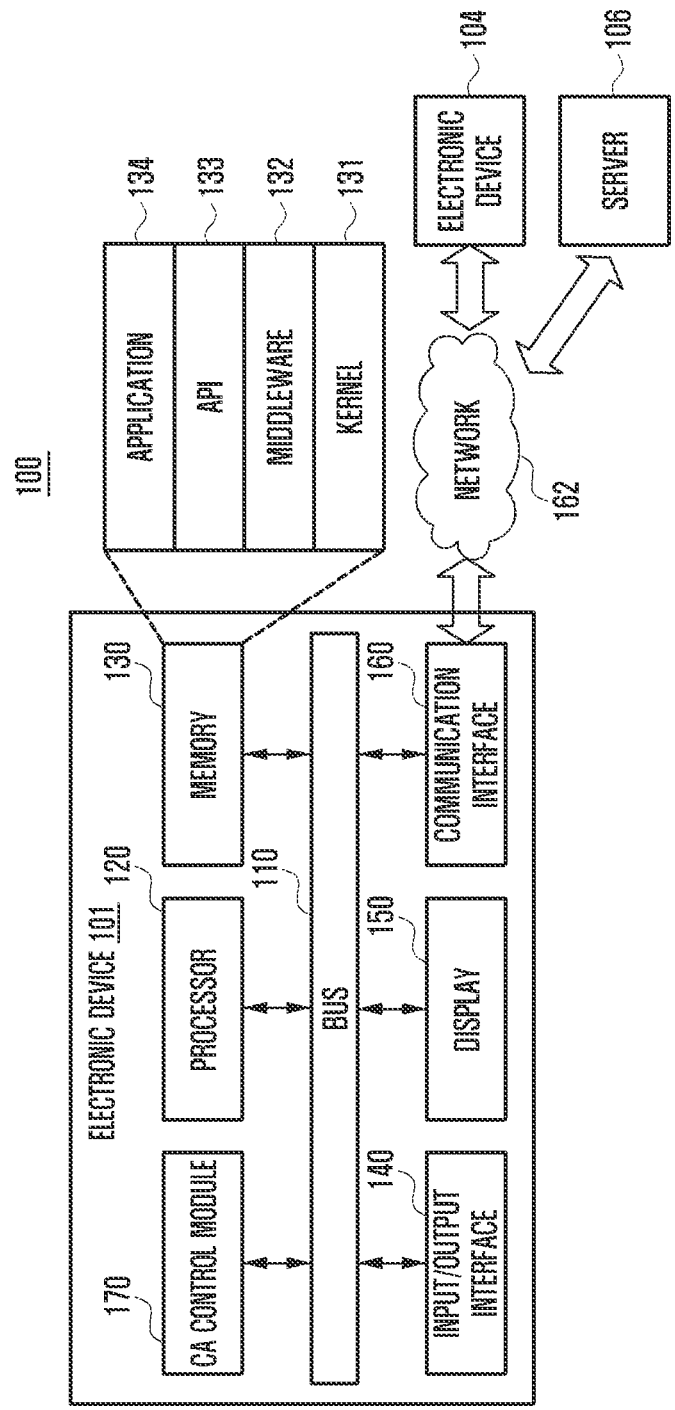
FIG. 1 illustrates a schematic block diagram of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of the combinations of words listed together. For example, the expressions "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic accessory, an electronic tattoo, and a smart watch).

According to some embodiments, the electronic device may be a smart home appliance having a communication function. The smart home appliance may include at least one of a television (TV), a digital video disk (DVD) player, an audio player, an air conditioner, a cleaner, an oven, a microwave oven, a washing machine, an air cleaner, a set-top box, a TV box (for example, Samsung HOMESYNC, APPLE TV, or GOOGLE TV), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 illustrates a schematic block diagram of a network environment including an electronic device according to various embodiments of the present disclosure.

Referring to FIG. 1, the electronic device 101 may include a bus 110, a processor 120, a memory 130, an input/output interface 140, a display 150, a communication interface 160, and a carrier aggregation (CA) control module 170.

The bus 110 may be a circuit that connects the components described above to each other and transfers communication data (e.g., control messages) between the components.

The processor 120 may receive instructions from the components (e.g., the memory 130, input/output interface 140, display 150, communication interface 160, CA control module 170, etc.) via the bus 110, decode the instructions and perform corresponding operations or data processing according to the decoded instructions.

The processor 120 may include at least one Application Processor (AP) and/or at least one Communication Processor (CP). The AP and the CP included in the processor 120, the AP and the CP may be included in different Integrated Circuits (IC) packages, respectively. According to an embodiment, the AP and the CP may be included in a single IC package.

The memory 130 may store instructions or data transferred from/created in the processor 120 or the other components (e.g., the input/output interface 140, display 150, communication interface 160, CA control module 170, etc.). The memory 130 may include programming modules, e.g., a kernel 131, middleware 132, application programming interface (API) 133, application module 134, etc. Each of the programming modules may be software, firmware, hardware or a combination thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 may include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 101 and an external electronic device (for example, electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 101 to the external electronic device (for example, electronic device 104). Additionally or alternatively, the notification relay application may receive notification information from, for example, the external electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device 104 communicating with the electronic device 101, an application executed in the external electronic device 104, or a service (for example, call service or message service) provided by the external electronic device 104.

According to various embodiments, the application 134 may include an application designated according to an attribute (for example, type of electronic device) of the external electronic device 104. For example, when the external electronic device 104 is an MP3 player, the application 134 may include an application related to music reproduction. Similarly, when the external electronic device 104 is a mobile medical device, the application 134 may include an application related to health care. According to an embodiment, the application 134 may include at least one of an application designated to the electronic device 101 and an application received from an external electronic device (for example, server 106 or electronic device 104).

The input/output interface 140 may receive a user's input instructions or data through an input/output device (e.g., a sensor, keyboard, or touch screen), and transfer them to the processor 120, memory 130, communication interface 160, or CA control module 170 through, for example, the bus 110. For example, the input/output interface 140 may provide data corresponding to a user's touch input to a touch screen to the processor 120. The input/output interface 140 may output instructions or data, transferred from the processor 120, memory 130, communication interface 160, or CA control module 170 through the bus 110, to the input/output device (e.g., a loudspeaker or display). For example, the input/output interface 140 may output voice data processed by the processor 120 to the loudspeaker.

The communication interface 160 connects communication between the electronic device 101 and the external device (for example, electronic device 104 or server 106). For example, the communication interface 160 may access a network 162 through wireless or wired communication to communicate with the external device. The wireless communication includes at least one of, for example, WiFi, BlueTooth (BT), Near Field Communication (NFC), a GPS, and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 101 and the external device may be supported by at least one of the application 134, the application programming interface 133, the middleware 132, the kernel 131, and the communication interface 160.

According to an embodiment, the server 106 may provide information to/receive information from the electronic device 101 when at least one operation (or function) is implemented by the electronic device 101.

The carrier aggregation (CA) control module 170 may process at least part of information obtained from the other components (e.g., the processor 120, memory 130, input/output interface 140, communication interface 160, etc.) and may provide it to other network components (e.g., server 106, electronic device 104, etc.) in various ways. The CA control module 170 will be described in detail later referring to FIG. 5.

Figure 2:
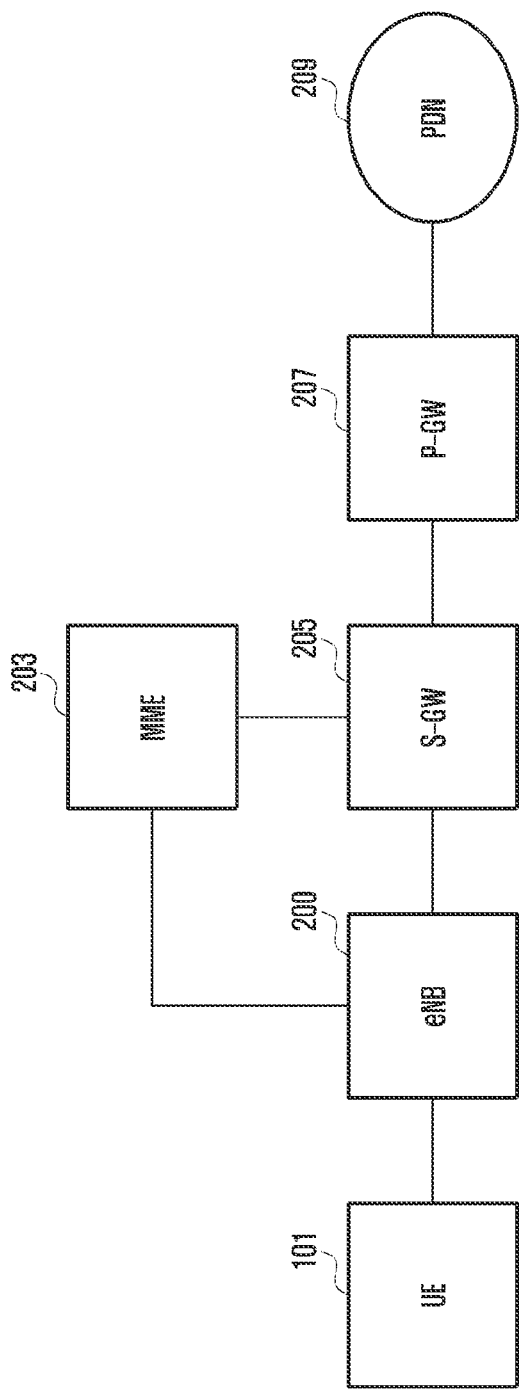
FIG. 2 illustrates a schematic block diagram of a wireless communication system according to various embodiments of the present disclosure.

FIG. 2 illustrates a schematic block diagram of a wireless communication system according to various embodiments of the present disclosure. Although the embodiment of FIG. 2 shows a configuration of a long term evolution (LTE) system, it should be understood that the various embodiments of the present disclosure are not limited thereto.

Referring to FIG. 2, the LTE system may include an LTE entity and Evolved Packet Core (EPC) entity. The LTE entity includes an electronic device (e.g., user equipment 101) and a base station (e.g., an evolved Node B 200). The EPC entity includes Mobility Management Entity (MME) 203, Serving Gateway (S-GW) 205, and Packet data network Gateway (P-GW) 207. The P-GW 207 may be connected to a Packet Data Network (PDN) 209. In an embodiment, the evolved Node B (eNB) 200, MME 203, S-GW 205, P-GW 207 and PDN 209 may be included in the network 162 shown in FIG. 1.

The user equipment (UE) 101 may be connected to the eNB 200 via the communication interface 160. For example, the eNB 200 may communicate with the UE 101 through the communication interface 160 using Radio Resource Management (RRM) techniques including radio bearer control, radio acceptance control, dynamic radio resource allocation, load distribution, inter-cell interference control, etc. MME 203 is an Evolved UMTS Terrestrial Radio Access Network (E-UTRAN) control plain entity that communicates with Home Subscriber Server (HSS) to authenticate a user and to download a user profile. The MME 203 may further provide the UE 101 with Non-Access Stratum (NAS) signaling using Mobility Management of Evolved Packet System (EPS) and Session Management of EPS.

The S-GW 205 may be an end point of the EPC of E-UTRAN. The S-GW 205 may be an anchoring point during a handover between eNBs and between 3GPP systems. The P-GW 207 may connect the UE 101 and the external PDN 209. The P-GW 207 may allocate an Internet Protocol (IP) address to the UE 101. The P-GW 207 may serve as a mobility anchoring point during a handover between 3GPP and non-3GPP systems. The P-GW 207 may provide a charging function to UE as it receives a PPC rule from a Policy Charging and Rules Function (PCRF) and applies it to the UE.

The P-GW 207 may provide services functions, such as IP Multimedia Subsystem (IMS) and Internet, to an IP network outside or inside a service provider.

Figure 3:
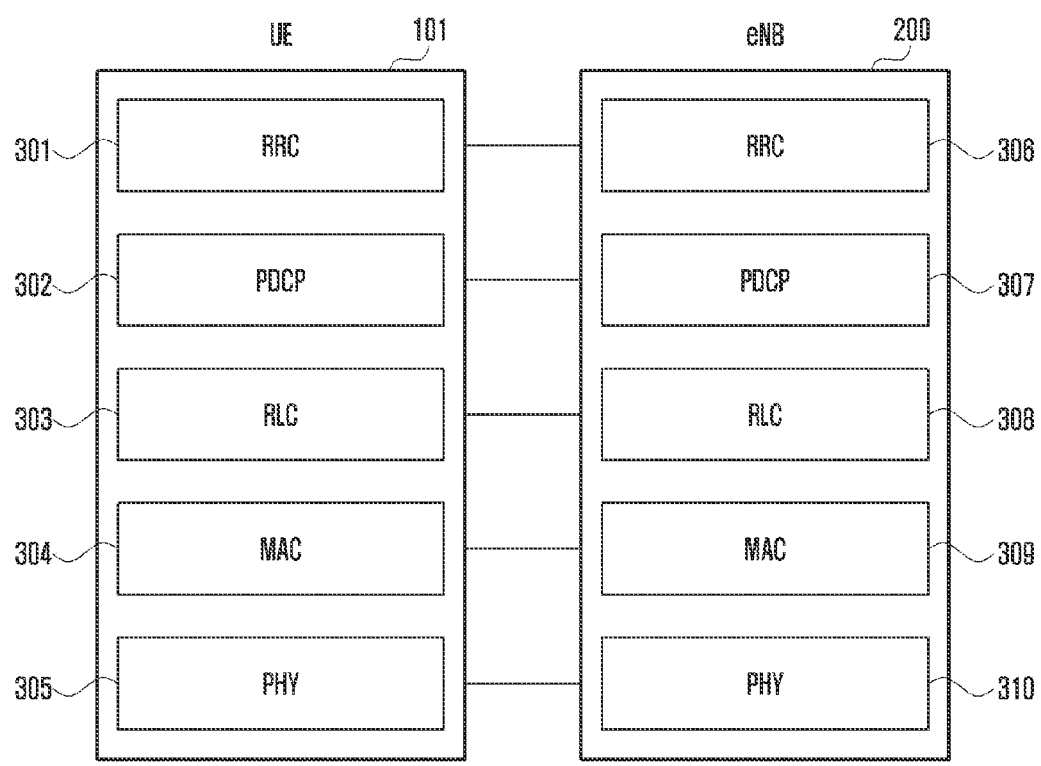
FIG. 3 illustrates a view of the protocol stack between user equipment (UE) and evolved Node B (eNB) according to an embodiment of the present disclosure.

FIG. 3 illustrates a view of the protocol stack between UE 101 and eNB 200 according to an embodiment of the present disclosure.

Referring to FIG. 3, the protocols of UE 101 may be related to the protocols of eNB 200. For example, Radio Resource Control (RRC) protocol 301 and 306 is responsible for establishing a connection between UE 101 and eNB 200 and maintenance of the connection. Packet Data Convergence Protocol (PDCP) 302 and 307 is responsible for ciphering of RRC-Protocol Data Units (RRC-PDUs) and guaranteeing the integrity of the RRC-PDUs. Radio Link Control (RLC) 303 and 308 is responsible for segmentation or concatenation of RDCP-PDUs transferred from PDCP 302 and 308, thereby adjusting transmission packet length and guaranteeing the reliability of data through Automatic Repeat request (ARQ).

Medium Access Control (MAC) protocol 304 and 308 is responsible for scheduling data transmission between UE 101 and eNB 200, multiplexing of data, and guaranteeing of the reliability of data through HARQ.

Physical layer (PHY) 305 and 310 physically transmits data between UE 101 and eNB 200. For example, PHY 305 may physically transmit MAC-PDUs transferred from the MAC 304 to eNB 200 or PHY 305 may physically receive data from eNB 200. Likewise, PHY 310 may physically transmit MAC-PDUs transferred from the MAC 309 to UE 101 or PHY 310 may physically receive data from UE 101. PHY 305 and 310 may transmit the MAC-PDUs using multiple access technologies, such as Orthogonal Frequency Division Multiple Access (OFDMA), Single Carrier-Frequency Division Multiple Access (SC-FDMA), Multi Carrier-Frequency Division Multiple Access (MC-FDMA), etc.

Figure 4:
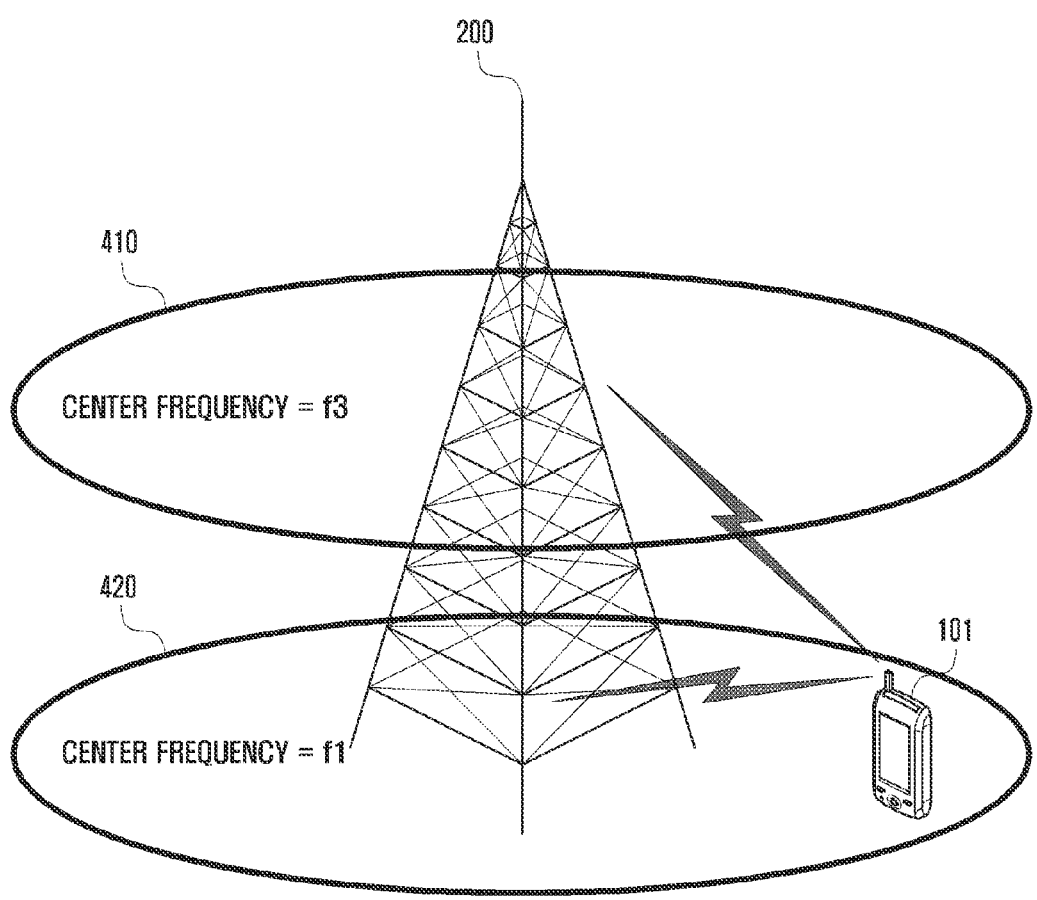
FIG. 4 is a view that describes the principle of carrier aggregation (CA) according to an embodiment of the present disclosure.

FIG. 4 is a view that describes the principle of CA according to an embodiment of the present disclosure.

Referring to FIG. 4, one eNB 200 may broadcast/receive multi-carriers over frequency bands. For example, when an eNB 200 broadcasts a carrier 420 of center frequency f1 and a carrier 410 of center frequency f3, conventional art allows UE 101 to transmit/receive data via one of the carriers 410 or 420. However, the present disclosure allows UE 101 to be configured to communicate using CA such that the UE simultaneously transmits/receives data using a plurality of carriers (e.g., carrier 410 and carrier 420). The eNB 200 allocates more carriers to UE 101 using CA according to states, so that the UE 101 can increase the data transmission rate.

In an exemplary embodiment, one cell may be configured to include at least one forward carrier (e.g., downlink carrier) and at least one reverse carrier (e.g., uplink carrier)

associated with eNB 200. Using CA, UE 101 may simultaneously transmit/receive data via a plurality of carriers associated with eNB 200 or with a plurality of carriers associated with a plurality of cells. When UE 101 simultaneously transmits/receives data over the plurality of carriers associated with eNB 200, the maximum transmission rate between UE 101 and eNB 200 may increase in proportion to the number of aggregated carriers. For example, when a single carrier is used and UE 101 establishes communication with eNB 200 using a call connection through PCELL, UE 101 performs signaling with the eNB 200 through the call connection. Alternatively, when a plurality of carriers is used, UE 101 may establish communications with eNB 200 such that transmission/reception of data to/from eNB 200 is performed through PCELL and at least one SCELL, thereby increasing the data transmission rate.

Figure 5:
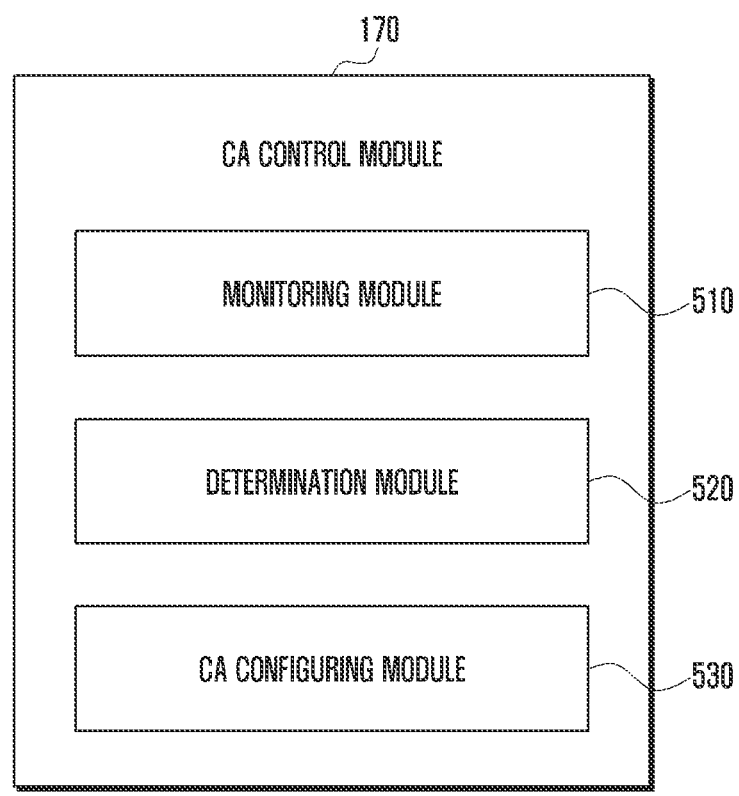
FIG. 5 is a detailed view of a CA control module according to various embodiments of the present disclosure.

FIG. 5 is a detailed view of a CA control module 170 according to various embodiments of the present disclosure.

Referring to FIG. 5, the CA control module 170 may include a monitoring module 510, a determination module 520, and a CA configuring module 530. The monitoring module 510 may monitor the amount of data transmitted/received between UE 101 and eNB 200 when a call connection is established between the UE 101 and the eNB 200. In an embodiment, the monitoring module 510 may monitor the amount of data transmitted/received based on the measured traffic. For example, the monitoring module 510 may monitor the data transmission/reception rate in which the data is transmitted/received between the UE 101 and the eNB 200. As another example, the monitoring module 510 may monitor the type of information to be transmitted (e.g., data, audio, etc.), an amount of data to be transmitted (e.g., stored in a buffer, etc.) from the UE 101 to the eNB 200, or an amount of data in waiting to be received at the UE 101 from the eNB 200.

The determination module 520 may compare the amount of transmitted/received data with a threshold set for CA activation. For example, the threshold set for CA activation may be based on an amount of traffic or a data transmission/reception rate set for smooth transmission/reception of data between UE 101 and eNB 200 through only PCELL.

The determination module 520 may control transmission/reception of data through only PCELL when the amount of data transmitted/received is less than or equal to a threshold (e.g., the CA activation threshold).

The determination module 520 may determine whether data to be transmitted/received is data that needs a high data transmission rate (or data that is subject to a predetermined data transmission rate requirement or data that has to be transmitted within a period of time). In an embodiment, the determination module 520 may determine whether data to be transmitted/received is data that needs a high data transmission rate based on a function (e.g., application) that is using (running) on the UE 101 or the relevance of the function with respect to the data to be transmitted/received. For example, when a video call function is running on UE 101, the determination module 520 may control, in real-time, the transmission/reception of video data and voice data for a voice call. As another example, when a voice call function is running on UE 101 and content data (e.g., text file, image files, or video files) is transmitted/received to be shared in real time during the voice call, the determination module 520 may determine that the transmitted/received data needs a high data transmission rate. As still another example, when a chatting function (e.g., real time text transmission over the network) is running on the UE 101 and content data (e.g., text file, image files, or video files) is transmitted/received to be shared in real time during the chat, the determination module 520 may determine that the transmitted/received data needs a high data transmission rate.

In an embodiment, when UE 101 runs a function in which the running time (e.g., duration of function execution or playback) can be predicted or a function in which the running time has been set, the determination module 520 may determine that the transmitted/received data does not need a high data transmission rate. For example, when UE 101 runs a multimedia file playback function in a streaming mode, the determination module 520 may determine that the transmitted/received data corresponding to a multimedia file does not need a high data transmission rate. As another example, when UE 101 is running an application, e.g., an MP3 player function, i.e., playing a music file stored in the memory, and is simultaneously performing transmission/reception of data, the determination module 520 may determine that the transmitted/received data does not need a high data transmission rate. As still another example, when UE 101 is running a voice call function and simultaneously performing transmission/reception of data that is not related to the voice call, the determination module 520 may determine that the transmitted/received data does not need a high data transmission rate.

When the determination module 520 ascertains that the transmitted/received data needs a high data transmission rate, it may control transmission/reception of data through PCELL and a pre-set number of secondary cells (SCELLs). For example, the determination module 520 may control transmission/reception of data through a pre-set number of SCELLs when a call connection is established between UE 101 and eNB 200. As another example, the determination module 520 may control transmission/reception of data through a pre-set number of SCELLs based on radio signal strength.

When the determination module 520 ascertains that the transmitted/received data does not need a high data transmission rate, it may determine an estimated amount of time to use an executed function.

When a multimedia file playback function is executed in a streaming mode, the determination module 520 may check information about a playback (running) time and the size of a multimedia file, etc., through the downloaded data, e.g., meta-data. The determination module 520 may determine an estimated amount of time to play back a multimedia file in a streaming mode, based on a playback (running) time and the size of the multimedia file, the amount of data used, etc.

In an embodiment, when UE 101 is running an application, e.g., playing back an MP3 file stored in the memory, the determination module 520 may determine that the estimated amount of time for using the MP3 player function based on the information about a period of time that the MP3 file is played back.

In an embodiment, the determination module 520 may determine an amount of time to use an executed function based on information about use of a user function (or an execution pattern of a function).

In an embodiment, the determination module 520 may calculate the estimated amount of time available for transmission/reception of data (or the estimated amount of time necessary to complete transmission/reception of data) according to the number of activated SCELLs. As another example, the determination module 520 may calculate the amount of power consumed at the UE 101 for transmission/reception of data according to the number of SCELLs.

The CA configuring module 530 may control transmission/reception of data through the determined number of SCELLs. For example, the CA configuring module 530 may control transmission of the information based on the number of SCELLs associated with eNB 200.

According to an embodiment, the electronic device (terminal or UE) 101 includes a communication interface and a processor 120. The processor 120 controls the communication interface to establish communications associated with a call between the UE 101 and an eNB 200, monitors an amount of data used for transmission/reception during the connected call, determines an estimated amount of time to execute a function on the UE 101, and configures CA communications based on the monitored amount of data used and the estimated amount of time determined to execute the function.

According to an embodiment, the amount of data used includes at least one of the following: a data transmission rate, traffic, type of data, and the amount of data to be transmitted/received.

According to an embodiment, the processor 120 determines whether the data to be transmitted/received needs a high data transmission rate based on the executed function.

According to an embodiment, the processor 120 determines the estimated amount of time needed to execute the function based on information associated with the use of the executed function.

According to an embodiment, the executed function includes: a call function.

According to an embodiment, the information about use of the call function includes at least one of the following: a phone number of other calling party's on the line, a start time of the call, and a location associated with where the call is made.

According to an embodiment, when the data to be transmitted/received is a plurality of multimedia files, the executed function includes a function for playing back at least one of the plurality of multimedia files in a streaming mode.

According to an embodiment, the executed function includes applications that are executed on the electronic device.

According to an embodiment, the processor 120 transmits/receives the data within the estimated amount of time determined to execute the function and determines the minimum number of SCELLs associated with eNB 200 that are configured or activated.

According to an embodiment, the processor 120 transmits/receives the data within the estimated amount of time determined to execute the function and determines the number of SCELLs associated with eNB 200 based on a minimum amount of electronic device power consumption when transmitting/receiving the data.

According to an embodiment, the processor 120 configures CA periodically or in real-time.

Figure 6:
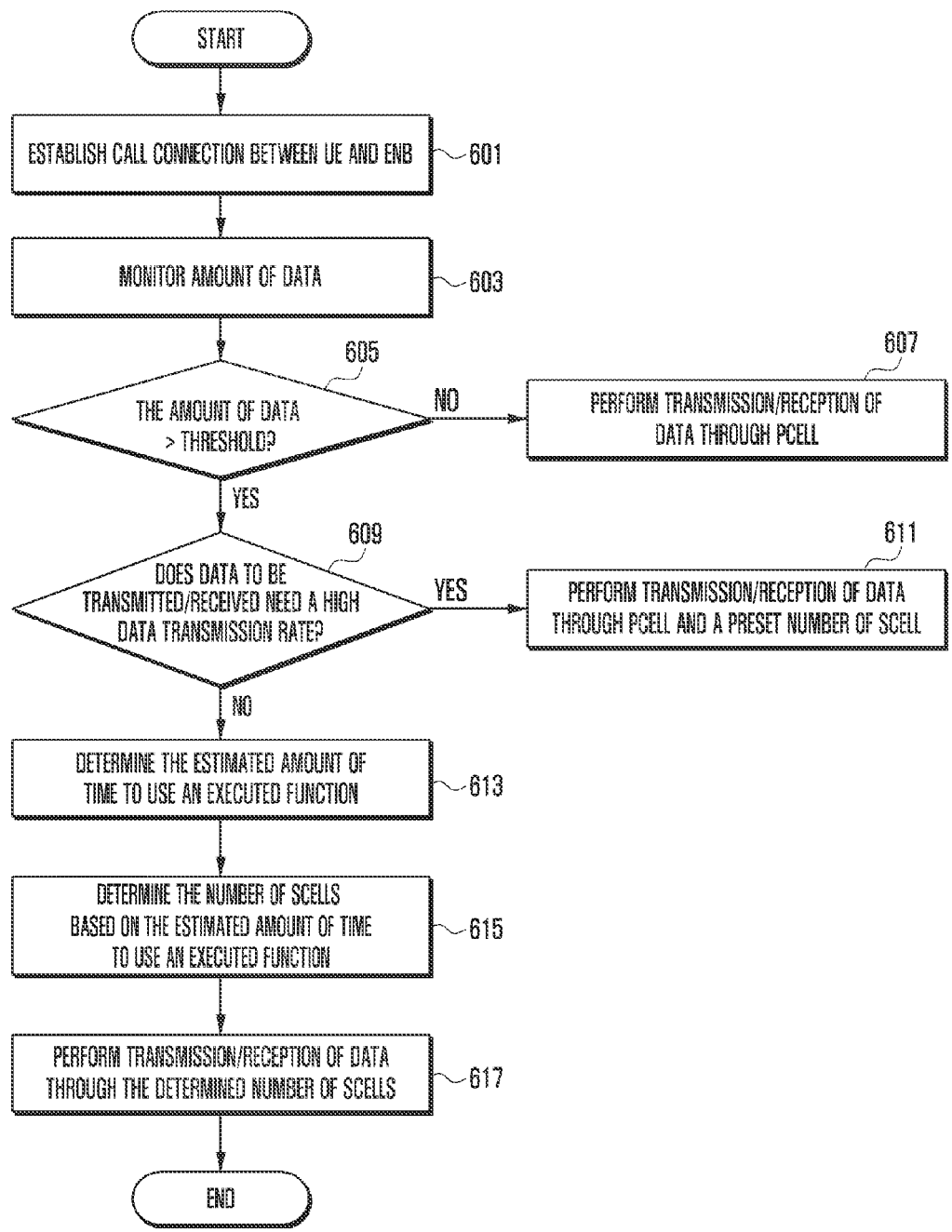
FIG. 6 is a flow chart that describes a method of controlling CA according to various embodiments of the present disclosure.

FIG. 6 is a flow chart that describes a method of controlling CA according to various embodiments of the present disclosure.

Referring to FIG. 6, the processor 120, e.g., communication processor (CP), may control a call connection with the eNB 200 in operation 601. For example, the processor 120 may establish a call connection with the eNB 200 through the PCELL and may perform signaling to the eNB 200 through the connected call. As another example, the processor 120 may control transmission/reception of data to/from the eNB 200 through PCELL and at least one SCELL.

The processor 120 may monitor the amount of transmitted/received data in operation 603. In an embodiment, the processor 120 (or a measurement module as an additional module) may measure traffic and monitor the amount of transmitted/received data based on the measured traffic. For example, the processor 120 may monitor a data transmission/reception rate associated with the measured traffic. As another example, the processor 120 may monitor data type, an amount of data to be transmitted to the eNB 200, an amount of data stored in a buffer, etc., or an amount of data in waiting to be received from the eNB 200.

The processor 120 may compare the amount of transmitted/received data with a threshold set for CA activation in operation 605. For example, the threshold set for CA activation may be based on an amount of traffic or a data transmission/reception rate associated with smooth transmission/reception of data between UE 101 and eNB 200 through only PCELL.

When the amount of transmitted/received data is less than or equal to the CA activation threshold in operation 605, the processor 120 may control transmission/reception of data through only PCELL in operation 607.

On the contrary, when the amount of transmitted/received data is greater than the CA activation threshold in operation 605, the processor 120 may determine whether the transmitted/received data is data that needs a high data transmission rate (or data that is subject to a predetermined data transmission rate or data that has to be transmitted within a period of time) in operation 609. In an embodiment, the processor 120 may determine whether data to be transmitted/received is data that needs a high data transmission rate based on a function that is using (running) on the UE 101 or the relevance of the function with respect to the data to be transmitted/received. For example, when a video call function is running on UE 101, the processor 120 may control, in real-time, the transmission/reception of video data and voice data for a voice call. In that case, the processor 120 may determine that the transmitted/received voice and video data needs a high data transmission rate. As another example, when a voice call function is running on UE 101 and content data (e.g., text file, image files, or video files) is transmitted/received to be shared in real time during the voice call, the processor 120 may determine that the transmitted/received data needs a high data transmission rate. As still another example, when a chatting function is running on the UE 101 and content data (e.g., text file, image files, or video files) is transmitted/received to be shared in real time during the chat, the processor 120 may determine that the transmitted/received data needs a high data transmission rate.

In an embodiment, when UE 101 runs a function in which the running time can be predicted or a function in which the running time has been set, the processor 120 may determine that the transmitted/received data does not need a high data transmission rate. For example, when UE 101 is downloading a plurality of multimedia files and plays back one of them in a streaming mode, the processor 120 may estimate an amount of time to use the multimedia in playback. That is, the processor 120 may determine that the transmitted/received data corresponding to the multimedia file, downloaded in a streaming mode, does not need a high data transmission rate. As another example, when UE 101 is running an application, e.g., an MP3 player function as a function of which the running time has been set, i.e., playing a music file stored in the memory, and is simultaneously performing transmission/reception of data, the processor 120 may determine that the transmitted/received data does not need a high data transmission rate. As still another example, when UE 101 is running a voice call function and simultaneously performing transmission/reception of data that is not related to the voice call, the processor 120 may determine that the transmitted/received data does not need a high data transmission rate.

When the processor 120 ascertains that transmitted/received data needs a high data transmission rate in operation 609, it may control transmission/reception of data through PCELL and a pre-set number of SCELLs in operation 611. For example, the processor 120 may control transmission/reception of data through a pre-set number of SCELLs when a call connection is established between UE 101 and eNB 200. As another example, the processor 120 may control transmission/reception of data through a pre-set number of SCELLs based on radio signal strength.

When the processor 120 ascertains that transmitted/received data does not need a high data transmission rate in operation 609, it may determine an estimated amount of time to use an executed function.

In an embodiment, when a multimedia file playback function is executed in a streaming mode, the processor 120 may check information about the size of a multimedia file or a video running time based on the downloaded data, e.g., meta-data. The processor 120 may determine an estimated amount of time to play back a multimedia file in a streaming mode based on a playback (running) time and the size of the multimedia file, the amount of used data, etc.

In an embodiment, when UE 101 is running an application, e.g., playing back an MP3 file stored in the memory, the processor 120 may determine that the estimated amount of time to use the MP3 player function based on the information about an amount of time to complete playback of the MP3 file.

In an embodiment, the processor 120 may determine an amount of time to use an executed function based on information associated with the use of a user function (or an execution pattern of a function). This process is described in detail as follows referring to FIGS. 7 and 8.

Figure 7:
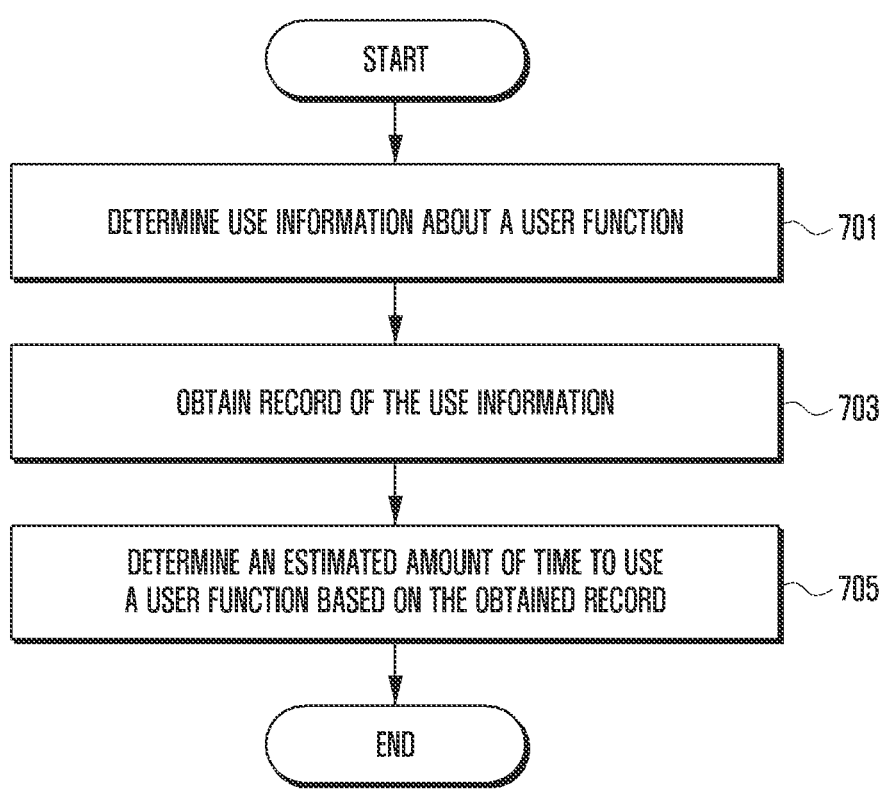
FIG. 7 is a flow chart that describes a process of calculating the estimated amount of time to use a function running on UE according to an embodiment of the present disclosure.

FIG. 7 is a flow chart that describes a process of calculating an estimated amount of time to use a function running on UE 101 according to an embodiment of the present disclosure.

The processor 120 may determine information associated with the use of a user function (e.g., an application) in operation 701. In an embodiment, information about use of a user function may mean information created according to use of function or information related to use of function. For example, when a function running on UE 101 is an application for a portal site, information about use of a user function may be information associated with a time of access to the portal site or information about a location of access to the portal site. It should be understood that the application according to the present disclosure is not limited to an application for portal sites. For example, the present disclosure may also include digital multimedia broadcasting (DMB) application, schedule application, social networking service (SNS), applications executed through a network, such as Internet applications, etc., and other various applications executed by the processor of the UE 101.

The processor 120 may obtain a record (or a log) created as information of using a user function has been accumulated for a period of time in operation 703. For example, the processor 120 may obtain a record (or a log) of accesses to a portal site for a period of time from a memory or a server. The processor 120 may obtain a record (or a log) created as information of accessing a portal site has been accumulated for a period of time from a memory 130 or a corresponding server.

The processor 120 may calculate an estimated amount of time to use a function based on a log of information about the use of a user function in operation 705. For example, when a function running on UE 101 is an application, e.g., an application for a portal site, the processor 120 may calculate an average amount of time that a user has spent (accessed) on the portal site based on a log of visits to the portal site for a period of time. As another example, the processor 120 may calculate an average amount of time that a user has spent on the portal site based on a location where the user has visited the portal site and a time period in which the user has visited the portal site (e.g., from 8 p.m. to 9 p.m.), etc. The estimated amount of time to use a function may be calculated by various methods as well as a method of calculating the average. For example, the processor 120 may calculate the estimated amount of time to use a function by adding a designated amount of time to the average amount of time that a user has spent accessing the function. As another example, when there is a plurality of items of information about use of a user function, e.g., a location where the user has visited the portal site and a time period that the user has visited the portal site, the processor 120 prioritizes the items of information about use of a user function and calculates the estimated amount of time to use a function based on the order of priority. For example, when the order of priority is set so that a location where the user has visited the portal site has priority over a time period that the user has visited the portal site, the processor 120 may calculate an estimated amount of time to use a function based on the location where the user has visited the portal site. In addition, the estimated amount of time to use a function may be calculated by various statistical or mathematical methods.

Figure 8:
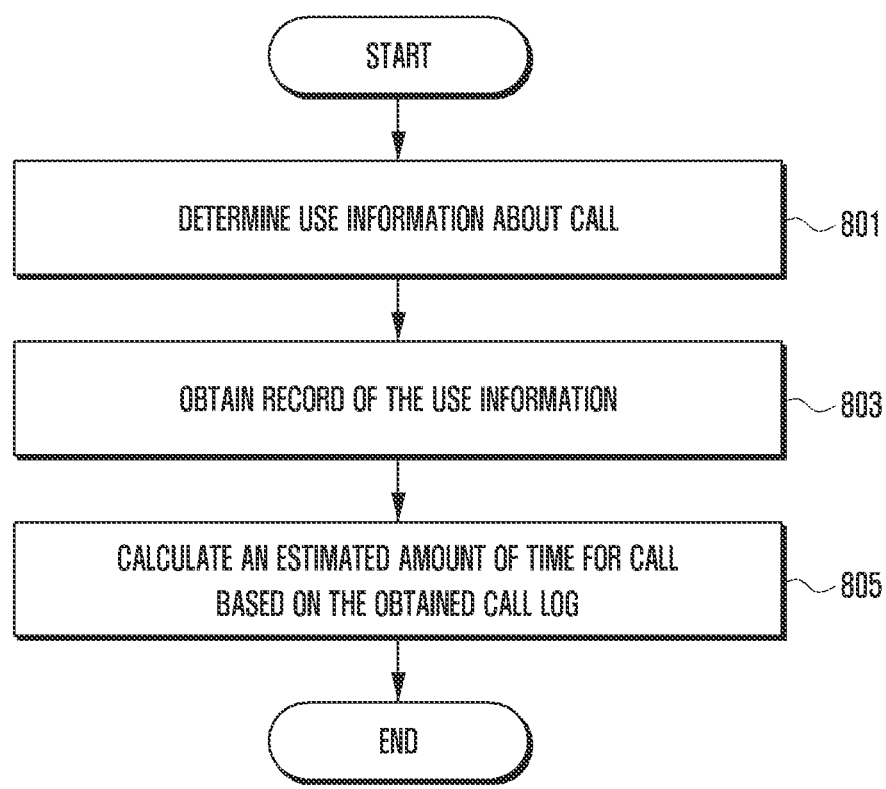
FIG. 8 is a flow chart that describes a process of calculating the estimated amount of time to use a function running on UE according to another embodiment of the present disclosure.

FIG. 8 is a flow chart that describes a process of calculating the estimated amount of time to use a function running on UE 101 according to another embodiment of the present disclosure. For example, when a call function is running on UE 101, the flow chart of FIG. 8 describes a method of calculating an estimated call duration.

The processor 120 may determine use information associated with the call in operation 801. For example, during the call with the other calling party, the processor 120 may determine the other calling party's phone number, the start time of the call, the location in which the call is initiated, etc.

The processor 120 may obtain a record from the determined use information about call in operation 803. For example, the processor 120 may obtain a call log about the other party (the other party's UE) on the line, a call log of the electronic device at the start time of the call (or a time period when the call is made) or at a specific location, etc., from a memory or a server.

The processor 120 may calculate an estimated amount of time for call, based on the obtained call log in operation 805. For example, the processor 120 may calculate the average call times that the user has called a specific calling party over a period of time and may determine that the average call time is an estimated amount of time for the current call. As another example, the processor 120 may calculate the average call times that calls have been made through UE 101 based on the start times of each of the calls (or the time periods of each call) and may determine that the average call time is an estimated amount of time for current call. As still another example, the processor 120 may calculate an average of the call times that calls have been made through EU 101 at a specific location and may determine that the average call time for a call placed at the specific location as an estimated amount of time for current call. It should be understood that the estimated amount of time for call may be calculated by various methods as well as a method of calculating the average. For example, the processor 120 may calculate the estimated amount of time for call by adding a designated amount of time to the average. As another example, when there is a plurality of call logs, e.g., other calling party's phone number, the start time of the call, and a calling place, the processor 120 prioritizes the call logs and calculates the estimated amount of time for call based on the order of priority. For example, when the order of priority is set so that other calling party's phone number has priority over the start time of the call or a calling place, the processor 120 may calculate the average call times that calls have been made with a specific calling party on the line and may determine that the average call time of calls that have been made with the specific calling parting as an estimated amount of time for the current call. It should be understood that the determination of an estimated amount of time for call is not limited to the methods described above. The estimated amount of time to use a function may be calculated by various statistical or mathematical methods.

Referring back to FIG. 6, the processor 120 may determine the number of SCELLs to be configured or activated based on the estimated amount of time to use a function in operation 615. This process is described in detail as follows referring to FIGS. 9 and 10.

Figure 9:
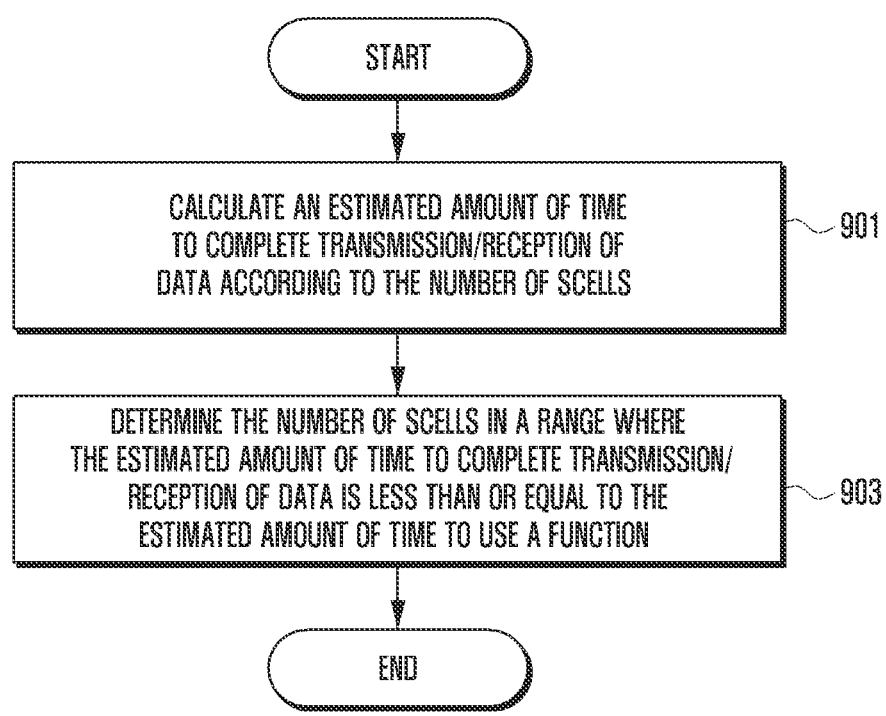
FIG. 9 is a flow chart that describes a method of determining the number of secondary cells (SCELLs) according to an embodiment of the present disclosure.

FIG. 9 is a flow chart that describes a method of determining the number of SCELLs according to an embodiment of the present disclosure.

The processor 120 may calculate an estimated amount of time available for transmission/reception of data (or an estimated amount of time necessary to complete transmission/reception of data) according to the number of SCELLs to be activated in operation 901. In an embodiment, the processor 120 may determine an amount of data used (e.g., an amount of data to be transmitted/received or an amount of data in waiting for transmission/reception) or the total amount of data to be transmitted/received. When data is transmitted/received through PCELL, the processor 120 may calculate a data transmission/reception rate. When data is transmitted/received through PCELL and added SCELL, the processor 120 may calculate a data transmission/reception rate. For example, when UE 101 transmits data through PCELL and SCELL, the processor 120 may determine that a data transmission rate increases in proportion to the number of SCELLs. The processor 120 may calculate an estimated amount of time for transmission/reception of data according the number of SCELLs configured or activated based on a data transmission rate according to the number of SCELLs and the total amount of data to be transmitted/received or an amount of data used.

The processor 120 may determine the number of SCELLs configured or activated in a range where the estimated amount of time available for transmission/reception of data (or an estimated amount of time necessary to complete transmission/reception of data) is less than or equal to the estimated amount of time to use an executed function in operation 903. For example, from among the estimated times for transmission/reception of data according to the number of SCELLs configured or activated, as calculated in operation 901, the processor 120 may determine the number of SCELLs that are less than and simultaneously closest to the estimated amount of time to use a function. Based on the number of SCELLs that are determined to be less than and simultaneously closest to the estimated amount of time to use a function, the processor 120 may determine which SCELLs are to be configured or activated for transmission/reception of data.

In an embodiment, the processor 120 may periodically determine the number of SCELLs configured or activated for transmission/reception of data. In another embodiment, the processor 120 may determine the number of SCELLs configured or activated in real-time.

Figure 10:
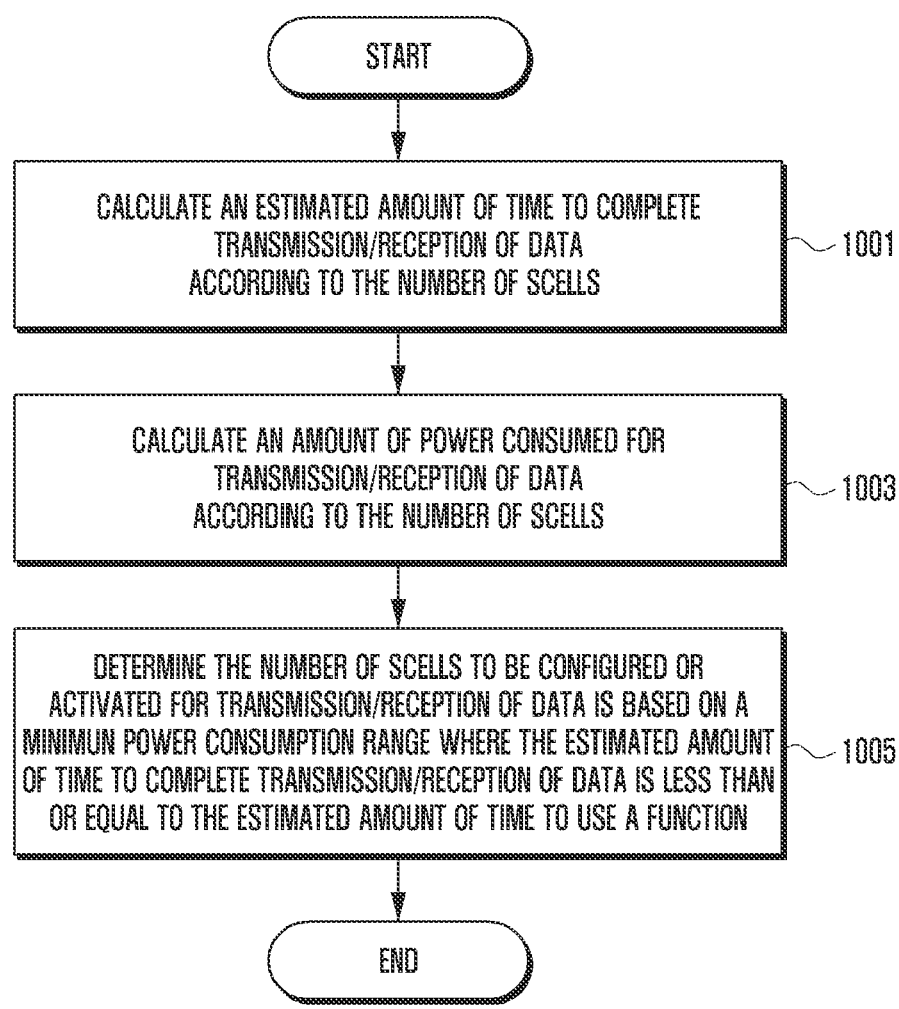
FIG. 10 is a flow chart that describes a method of determining the number of SCELLs according to another embodiment of the present disclosure.

FIG. 10 is a flow chart that describes a method of determining the number of SCELLs according to another embodiment of the present disclosure.

The processor 120 may calculate an estimated amount of time available for transmission/reception of data (or an estimated amount of time necessary to complete transmission/reception of data) according to the number of SCELLs to be activated in operation 1001, which is the same that as operation 901 shown in FIG. 9. In the following description, a detailed explanation about part of the embodiment will be omitted if it has been described above referring to FIG. 9.

The processor 120 may calculate an amount of power consumed by the UE 101 for transmission/reception of data according to the number of SCELLs in operation 1003. In an embodiment, the processor 120 may calculate an amount of power consumption according to the number of SCELLs configured or activated based on the estimated amount of time available for transmission/reception of data (or an estimated amount of time necessary to complete transmission/reception of data) according to the number of SCELLs, calculated in operation 1001, and an amount of power consumption per hour by PCELL or an amount of power consumption per hour by SCELL. For example, when the number of SCELLs configured or activated is two, the processor 120 may calculate the total amount of power consumption for two SCELLs by using the formula: (an estimated amount of time to complete transmission/reception of data by PCELL and 2 SCELLs)×(an amount of power consumption per hour according to the activation of PCELL+ an amount of power consumption per hour according to the activation of two SCELLs).

The processor 120 may determine the number of SCELLs to be configured or activated for transmission/reception of data is based on a minimum power consumption range where the estimated amount of time to complete transmission/reception of data is less than or equal to the estimated amount of time to use a function in operation 1005.

In an embodiment, the processor 120 may periodically determine the number of SCELLs configured or activated for transmission/reception of data. In another embodiment, the processor 120 may determine the number of SCELLs configured or activated in real-time.

Referring back to FIG. 6, the processor 120 may transmit/receive data through the determined number of SCELLs in operation 617. For example, the processor 120 may transmit information regarding the determined number of SCELLs to the eNB 200. The eNB 200 may configure or activate the determined number of SCELLs. The processor 120 may transmit/receive data through PCELL and the determined number of SCELLs.

Figure 11:
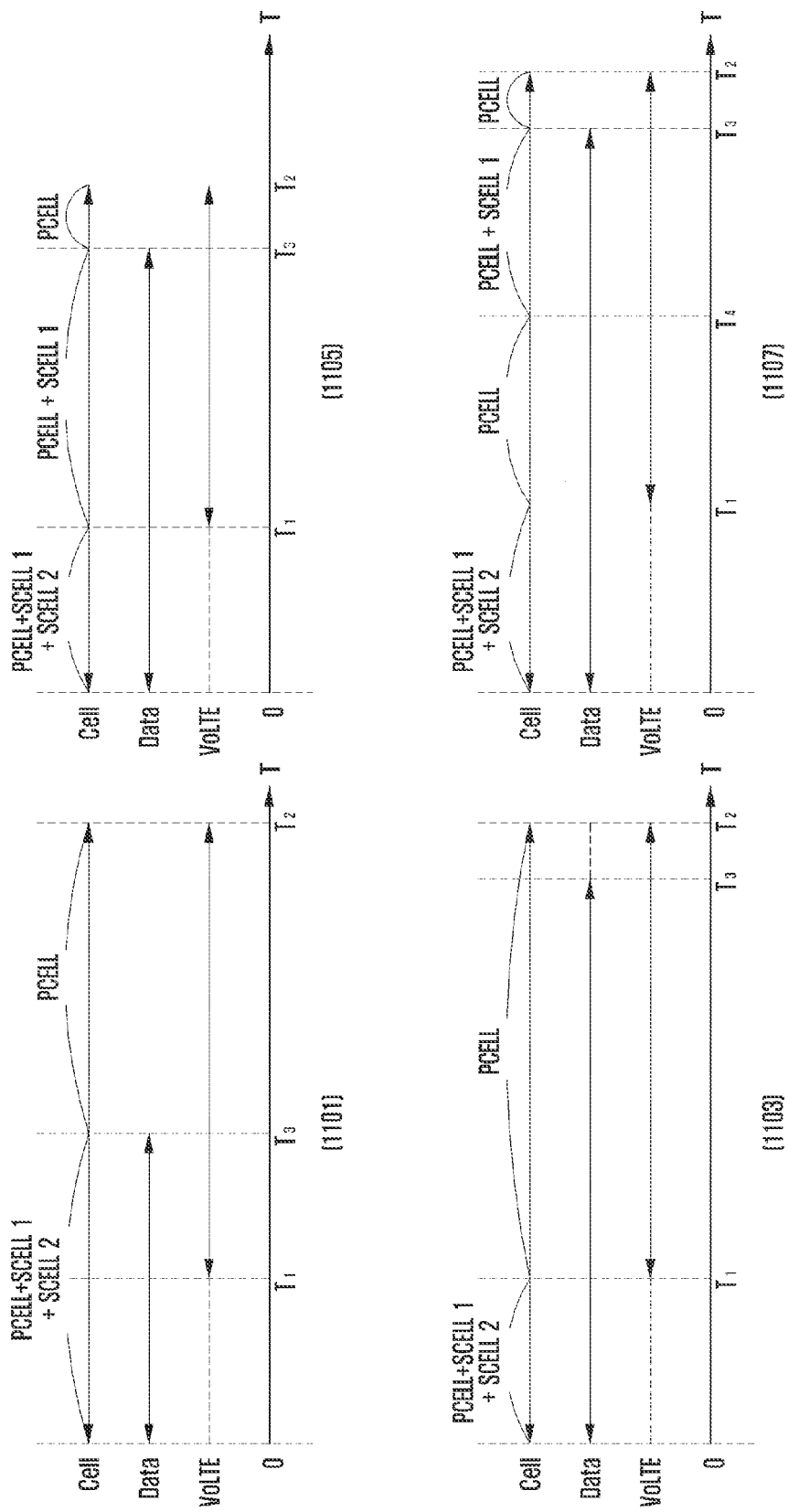
FIG. 11 is timing diagrams that describe a method of controlling CA according to various embodiments of the present disclosure.

FIG. 11 illustrates timing diagrams that describe a method of controlling CA according to various embodiments of the present disclosure.

Diagram 1101 of FIG. 11 shows a conventional CA control method. When a user executes a call function, e.g., Voice over LTE (VoLTE), at time point T1, the conventional UE completes transmission/reception of data, Data, by using available cells (or configured cells), e.g., PCELL, SCELL 1 and SCELL 2. When data has been transmitted/received, the conventional processor makes a voice call through PCELL during the interval between time points T1 and T3.

Diagram 1103 is a view to describe a method of controlling CA when UE executes a function, e.g., a call function, and an estimated amount of time for call is relatively large. As shown in diagram 1103, when the estimated amount of time for call is calculated as an interval from T1 to T2 and the time point (T3) that data has been transmitted/received is less than or equal to the calculated, call ending time point (T2), data is transmitted through only PCELL. In that case, the processor 120 may control to deactivate SCELL 1 and SCELL 2 that have been activated from 0 to T1.

Diagram 1105 is a view to describe a method of controlling CA when UE executes a function, e.g., a call function, and an estimated amount of time for call is relatively short. As shown in diagram 1105, when the estimated amount of time for call is calculated as an interval from T1 to T2 and the time point (T3) that data has been transmitted/received is less than or equal to the calculated call ending time point (T2), data is transmitted through PCELL and SCELL 1. In that case, the processor 120 may control to deactivate SCELL 2 that has been activated from 0 to T1.

Diagram 1107 is a view to describe a method of controlling CA periodically or in real-time when UE executes a function, e.g., a call function. As shown in diagram 1107, when a period is set to an interval from T1 to T4, the processor 120 may transmit/receive data through the determined number of SCELLs at time point T4.

According to an embodiment, a method of controlling CA of UE 101 includes connecting a call between the UE 101 and eNB 200, monitoring an amount of data used for transmission/reception during the connected call, determining an estimated amount of time to use a function executed on the UE 101, and configuring CA based on the amount of data used and the estimated amount of time to use a function.

According to an embodiment, the amount of data used includes at least one of the following: a data transmission rate, traffic, type of data, and the amount of data to be transmitted/received.

According to an embodiment, the method may further include: determining whether the data to be transmitted/received needs a high data transmission rate based on the executed function.

According to an embodiment, the determination of an estimated amount of time to use a function executed on the UE 101 includes determining an estimated amount of time to use the executed function based on information about use of the executed function.

According to an embodiment, the executed function includes a call function.

According to an embodiment, the information about use of the call function comprises at least one of the following: a phone number of other calling party's on the line, a start time of the call, and a place where the call is made.

According to an embodiment, when the data to be transmitted/received is a plurality of multimedia files, the executed function includes: a function for playing back at least one of the plurality of multimedia files in a streaming mode.

According to an embodiment, the executed function includes applications that are executed on the UE 101.

According to an embodiment, the configuration of CA includes: transmitting/receiving the data within the estimated amount of time to use the function and determining the minimum number of SCELLs that are configured or activated.

According to an embodiment, the configuration of CA includes: transmitting/receiving the data within the estimated amount of time to use the function and determining the number of SCELLs to consume a minimum amount of power when transmitting/receiving the data.

According to an embodiment, the configuration of CA includes: configuring CA periodically or in real-time.

Figure 12:
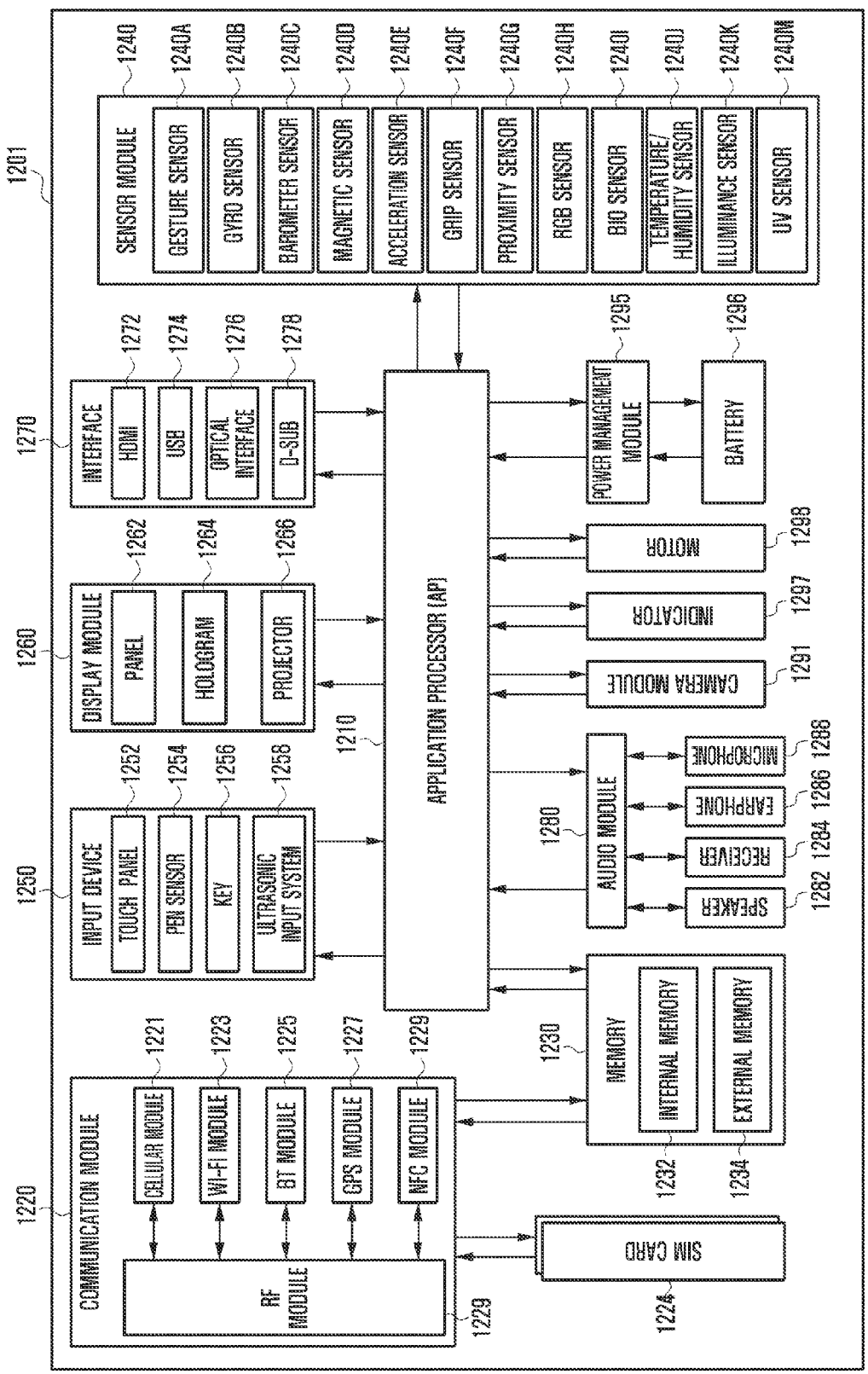
FIG. 12 is a schematic block diagram of UE according to various embodiments of the present disclosure.

FIG. 12 is a schematic block diagram of user equipment (UE) 1201 according to various embodiments of the present disclosure.

The UE 1201 may include all or part of the UE 101 shown in FIG. 1, for example. Referring to FIG. 12, the UE 1201 may include one or more application processors (APs) 1210, a communication module 1220, a subscriber identification module (SIM) card 1224, a memory 1230, a sensor module 1240, an input system 1250, a display 1260, an interface 1270, an audio module 1280, a camera module 1291, a power management module 1295, a battery 1296, an indicator 1297, and a motor 1298.

Each AP 1210 may execute the operating system or applications, control a plurality of hardware or software components connected to the AP 1210, process data, multimedia data, etc., and perform corresponding operations. The AP 1210 may be implemented with a system on chip (SoC). In an embodiment, the AP 1210 may further include a graphic processing unit (GPU), not shown.

The communication module 1220 (e.g., the communication interface 160 shown in FIG. 1) may perform communication for data transmission/reception between the other electronic devices (e.g., an electronic device 104, server 106) that are connected to the UE 1201 (UE 101) via the network. In an embodiment, the communication module 1220 may include a cellular module 1221, WiFi module 1223, BT module 1225, GPS module 1227, NFC module 1228 and RF module 1229.

The cellular module 1221 may provide voice call, video call, SMS or Internet service, etc., via a communication network (e.g., LTE, LTE-A, CDMA, WCDMA, UMTS, Wi-Bro, GSM, etc.). The cellular module 1221 may perform identification or authentication for UE in a communication network by using the subscriber identification module (e.g., SIM card 1224). According to an embodiment, the cellular module 1221 may perform part of the functions of the AP 1210. For example, the cellular module 1221 may perform part of the functions for controlling multimedia.

According to an embodiment, the cellular module 1221 may include a CP. The cellular module 1221 may be implemented with, for example, SoC. Although the embodiment shown in FIG. 12 is implemented in such a way that the cellular module 1221 (e.g., communication processor), the memory 230, the power management module 1295, etc., are separated from the AP 1210, it may be modified in such a way that the AP 1210 includes at least part of those components (e.g., cellular module 1221).

According to an embodiment, the AP 1210 or the cellular module 1221 (e.g., communication processor) may load commands or data transmitted from at least one of the following: non-volatile memory or other components, on volatile memory and then process the commands and data. The AP 1210 or the cellular module 1221 may store data in a non-volatile memory, which is transmitted from/created in at least one of the other components.

The Wi-Fi module 1223, the BT module 1225, the GPS module 1227, and the NFC module 1228 may each include processors for processing data transmitted/received through corresponding modules. Although the embodiment shown in FIG. 12 is implemented in such a way that the cellular module 1221, Wi-Fi module 1223, BT module 1225, GPS module 1227, and NFC module 1228 are separated from each other, it may be modified in such a way that at least part of those components (e.g., two or more) are included in an IC or an IC package. For example, at least part of the processors corresponding to the cellular module 1221, Wi-Fi module 1223, BT module 1225, GPS module 1227, and NFC module 1228, e.g., a communication processor corresponding to the cellular module 1221 and a Wi-Fi processor corresponding to the Wi-Fi module 1223, may be implemented with a SoC.

The radio frequency (RF) module 1229 may transmit or receive data, e.g., RF signals. The RF module 1229 may include a transceiver, a power amplifier module (PAM), a frequency filter, a low noise amplifier (LNA), etc., which are not shown. The RF module 1229 may also include parts for transmitting/receiving electromagnetic waves, e.g., conductors, wires, etc., via free space during wireless communication. Although the embodiment shown in FIG. 12 is implemented in such a way that the cellular module 1221, Wi-Fi module 1223, BT module 1225, GPS module 1227, and NFC module 1228 share the RF module 1229, it may be modified in such a way that at least one of those components transmits or receives RF signals via a separate RF module.

The subscriber identification module (SIM) card 1224 may be a card including subscriber identification module. The SIM card 1224 may be fitted into a slot of the UE. The SIM card 1224 may include unique identification information, e.g., integrated circuit card identifier (ICCID), or subscriber information, e.g., international mobile subscriber identity (IMSI).

The memory 1230 (e.g., the memory 130 shown in FIG. 1) may include built-in memory 1232 and/or external memory 1234. For example, the built-in memory 1232 may include at least one of the following: volatile memory (e.g., dynamic RAM (DRAM), static RAM (SRAM), synchronous dynamic RAM (SDRAM), etc.); non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory; etc.

According to an embodiment, the built-in memory 1232 may be a solid state drive (SSD). The external memory 1234 may further include: a flash drive, e.g., compact flash (CF), secure digital (SD), micro-secure digital (micro-SD), mini-secure digital (mini-SD), extreme digital (XD); a memory stick; etc. The external memory 1234 may be functionally connected to the UE 1201 via various types of interface. According to an embodiment, the UE 1201 may further include storage devices (or storage media) such as hard drives.

The sensor module 1240 may measure physical quantity or sense operation states of the UE 1201 and convert the measured or sensed data to electrical signals. The sensor module 1240 may include at least one of the following: gesture sensor 1240A, gyro sensor 1240B, atmospheric pressure sensor 1240C, magnetic sensor 1240D, acceleration sensor 1240E, grip sensor 1240F, proximity sensor 1240G, color sensor 1240H (e.g., red-green-blue (RGB) sensor), biosensor 1240I, temperature/humidity sensor 1240J, illuminance sensor 1240K, and ultra-violet (UV) sensor 1240M. Additionally or alternatively, the sensor module 1240 may also include an e-nose sensor (not shown), electromyography (EMG) sensor (not shown), an electroencephalogram (EEG) sensor (not shown), an electrocardiogram (ECG) sensor (not shown), Infra-Red (IR) sensor (not shown), iris sensor (not shown), a fingerprint sensor (not shown), etc. The sensor module 1240 may further include a control circuit for controlling at least one of the sensors.

The input system 1250 may include a touch panel 1252, a pen sensor 1254 (i.e., a digital pen sensor), a key 1256 and an ultrasonic input system 1258. The touch panel 1252 may sense touches in at least one of the following: capacitive sensing mode, pressure sensing mode, infrared sensing mode, and ultrasonic sensing mode. The touch panel 1252 may further include a control circuit. When the touch panel 1252 is designed to operate in capacitive sensing mode, it can sense physical touches or proximity of an object. The touch panel 1252 may further include a tactile layer. In that case, the touch panel 1252 can provide tactile feedback to the user.

The pen sensor 1254 (i.e., digital pen sensor) may be implemented in the same or similar fashion as receiving a user's touch input or by using a separate recognition sheet. The key 1256 may include physical buttons, optical keys or a key pad. The ultrasonic input system 1258 is a device that can sense sounds via a microphone 1288 of the UE 1201 by using an input tool for generating ultrasonic signals and can identify the data. The ultrasonic input system 1258 can sense signals in wireless mode. According to an embodiment, the UE 1201 may receive a user's inputs from an external system (e.g., a computer or server) via the communication module 1220.

The display 1260 (e.g., the display 150 shown in FIG. 1) may include a panel 1262, a hologram unit 1264, or a projector 1266. The panel 1262 may be implemented with a Liquid Crystal Display (LCD), Active Matrix Organic Light Emitting Diodes (AMOLEDs), or the like. The panel 1262 may be implemented in a flexible, transparent, or wearable form. The panel 1262 may form a single module with the touch panel 1252. The hologram unit 1264 shows a three-dimensional image in the air using interference of light. The projector 1226 may display images by projecting light on a screen. The screen may be placed, for example, inside or outside the UE 1201. According to an embodiment, the display 1260 may further include a control circuit for controlling the panel 1262, the hologram unit 1264, or the projector 1266.

The interface 1270 may include a high-definition multimedia interface (HDMI) 1272, a universal serial bus (USB) 1274, an optical interface 1276, a D-subminiature (D-sub) 1278, etc. The interface 1270 may be included in the communication interface 160 shown in FIG. 1. Additionally or alternatively, the interface 1270 may include a mobile high-media card (MHL) interface, a secure digital (SD) card/multi-media card (MMC) interface, an infrared data association (IrDA) interface, or the like.

The audio module 1280 may make conversion between audio and electrical signals. At least part of the components of the audio module 1280 may be included in the input/output interface 140 shown in FIG. 1. The audio module 1280 may process audio information output from/input to a speaker 1282, a receiver 1284, earphones 1286, a microphone 1288, etc.

The camera module 1291 may take still images or moving images. According to an embodiment, the camera module 1291 may include one or more image sensors (e.g., on front side and/or back side), a lens (not shown), an image signal processor (ISP) (not shown), a flash (e.g., LED or a xenon lamp) (not shown), or the like.

The power management module 1295 may manage electric power of the UE 1201. Although it is not shown, the power management module 1295 may include a power management integrated circuit (PMIC), a charger IC, a battery or fuel gauge, etc.

The PMIC may be implemented in the form of IC chip or SoC. Charging electric power may be performed in wired or wireless mode. The charger IC may charge a battery, preventing input over-voltage or input over-current from inputting to the battery from a charger. According to an embodiment, the charger IC may be implemented with wired charging type and/or wireless charging type. Examples of the wireless charging type of charger IC are a magnetic resonance type, a magnetic induction type, an electromagnetic wave type, etc. If the charger IC is a wireless charging type, it may include an additional circuit for wireless charging, e.g., a coil loop unit, a resonance circuit, a rectifier, etc.

The battery gauge may measure the residual amount of battery 1296, the level of voltage, the level of current, temperature during the charge. The battery 1296 charges electric power or supplies electric power to the UE 1201. The battery 1296 may include a rechargeable battery or a solar battery.

The indicator 1297 shows states of the UE 1201 or of the parts (e.g., AP 1210), e.g., a booting state, a message state, a recharging state, etc. The motor 1298 converts an electrical signal into a mechanical vibration. Although it is not shown, the UE 1201 may include a processor for supporting a mobile TV, e.g., a GPU. The processor for supporting a mobile TV may process media data that comply with standards of DMB, digital video broadcasting (DVB), media flow, etc.

Each of the elements/units of the UE according to various embodiments of the present disclosure may be implemented with one or more components, and corresponding component may be called different names according to types of UE. The UE according to the present disclosure may include at least one element described above. The UE may be modified in such a way as to: remove part of the elements or include new elements. In addition, the UE according to the present disclosure may also be modified in such a way that parts of the elements are integrated into one entity that performs their original functions.

In the present disclosure, the terminology '~module' refers to a 'unit' including hardware, software, firmware or a combination thereof. For example, the terminology '~module' is interchangeable with '~unit,' '~logic,' '~logical block,' '~component,' '~circuit,' etc. A 'module' may be the least unit or a part of an integrated component. A 'module' may be the least unit or a part thereof that can perform one or more functions. A 'module' may be implemented in mechanical or electronic mode. For example, 'modules' according to the present disclosure may be implemented with at least one of the following: an application specific integrated circuit (ASIC) chip, field-programmable gate array (FPGAs) and a programmable-logic device that can perform functions that are known or will be developed.

As described above, part of the method (e.g., operations) or system (e.g., modules or functions) according to the present disclosure can be implemented with command instructions that can be conducted via various types of computers and stored in computer-readable storage media, as types of programming modules, for example. One or more processors (e.g., processor 122) can execute commend instructions, thereby performing the functions. An example of the computer-readable storage media may be memory 130. At least part of the programming modules can be implemented (executed) by processor 210, for example. At least part of the programming module includes modules, programs, routines, sets of instructions or processes, etc., for example, in order to perform one or more functions.

Examples of computer-readable media include: magnetic media, such as hard disks, floppy disks, and magnetic tape; optical media such as CD-ROM disks and DVDs; magneto-optical media, such as floptical disks; and hardware devices that are specially configured to store and perform program instructions (programming modules), such as read-only memory (ROM), random access memory (RAM), flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

According to various embodiments, a storage medium stores instructions. When the instructions are executed by at least one processor, the instructions execute at least one process. The process includes: connecting a call between the UE and an eNB; checking an amount of data used for transmission/reception through the connected call; determining an estimated amount of time to use a function executed on the UE; and configuring carrier aggregation (CA) based on the checked, amount of data used and the determined, estimated amount of time to use a function.

According to various embodiments of the present disclosure, the electronic device and method of controlling carrier aggregation in a wireless communication system may prevent the waste of wireless resource and reduce the battery consumption power.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling carrier aggregation (CA) of an electronic device, the method comprising:
   connecting, via a communication module, a call between the electronic device and a base station;
   monitoring, via a processor, an amount of data used for at least one of transmission and reception during the connected call;
   determining, via the processor, an estimated amount of time to use a function executed on the electronic device based on a log of information accumulated for a period of time about use of the executed function, the executed function comprising a call function; and
   configuring, via the processor, the CA based on the amount of data used and the estimated amount of time to use a function,
   wherein the log of information about use of the call function comprises at least one of a phone number of other calling parties on the line, a start time of the call, and a location where the call is made.

2. The method of claim 1, wherein the amount of data used comprises at least one of the following:
   a data transmission rate, traffic, type of data, and the amount of data to be at least one of transmitted and received.

3. The method of claim 1, further comprising:
   determining, via the processor, whether the data used for at least one of transmission and reception needs a high data transmission rate based on the executed function.

4. The method of claim 1, wherein, when the data used for at least one of transmission and reception is a plurality of multimedia files, the executed function comprises:
   a function for playing back at least one of the plurality of multimedia files in a streaming mode.

5. The method of claim 1, wherein the executed function comprises applications that are executed on the electronic device.

6. The method of claim 1, wherein the configuration of the CA comprises:
   at least one of transmitting and receiving, via the communication module, the data within the estimated amount of time to use; and
   determining, via the processor, a minimum number of secondary cells (SCELLs) that are configured or activated.

7. The method of claim 1, wherein the configuring of the CA comprises:
   at least one of transmitting and receiving, via the communication module, the data within the estimated amount of time to use; and
   determining, via the processor, a number of secondary cells (SCELLs) to consume a minimum amount of power when performing the at least one of transmitting and receiving of the data.

8. The method of claim 1, wherein the configuring of the CA comprises configuring the CA periodically or in real-time.

9. An electronic device comprising:
   a communication interface;
   at least one processor; and
   a memory,
   wherein the memory stores instructions that, when executed, cause the at least one processor to:
   control the communication interface to connect a call between the electronic device and a base station,
   monitor an amount of data used for at least one of transmission and reception during the connected call,
   determine an estimated amount of time to use a function executed on the electronic device based on a log of information accumulated for a period of time about use of the executed function, the executed function comprising a call function, and
   configure carrier aggregation (CA) based on the amount of data used and the estimated amount of time to use a function, and
   wherein the log of information about use of the call function comprises at least one of a phone number of other calling parties on the line, a start time of the call, and a location where the call is made.

10. The electronic device of claim 9, wherein the amount of data used comprises at least one of the following:
    a data transmission rate, traffic, type of data, and the amount of data to be transmitted/received.

11. The electronic device of claim 9, wherein the memory stores instructions that, when executed, cause the at least one processor to:
    determine whether the data to be at least one of transmitted and received needs a high data transmission rate based on the executed function.

12. The electronic device of claim 9, wherein, when the data to be at least one of transmitted and received is a plurality of multimedia files, the executed function comprises:
    a function for playing back at least one of the plurality of multimedia files in a streaming mode.

13. The electronic device of claim 9, wherein the executed function comprises applications that are executed on the electronic device.

14. The electronic device of claim 9, wherein the memory stores instructions that, when executed, cause the at least one processor to:
    at least one of transmit and receive the data within the estimated amount of time to use and determines a minimum number of secondary cells (SCELLs) that are configured or activated.

15. The electronic device of claim 9, wherein the memory stores instructions that, when executed, cause the at least one processor to:
    at least one of transmit and receive the data within the estimated amount of time to use and determines a number of secondary cells (SCELLs) to consume a minimum amount of power when transmitting/receiving the data.

16. The electronic device of claim 9, wherein the memory stores instructions that, when executed, cause the at least one processor to:
    configure the CA periodically or in real-time.

17. A non-transitory computer-readable recording medium storing software instructions that, when executed, cause at least one processor to perform the method of claim 1.

* * * * *